United States Patent
Kurk et al.

(10) Patent No.: US 11,804,973 B2
(45) Date of Patent: Oct. 31, 2023

(54) APPARATUS AND SYSTEMS FOR PROVIDING DC POWER USING COMMUNICATION NETWORKS

(71) Applicant: CommScope Technologies LLC, Hickory, NC (US)

(72) Inventors: Morgan C. Kurk, Sachse, TX (US); Michael J. Williamson, Clayton, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 879 days.

(21) Appl. No.: 16/329,649

(22) PCT Filed: Aug. 30, 2017

(86) PCT No.: PCT/US2017/049241
§ 371 (c)(1),
(2) Date: Feb. 28, 2019

(87) PCT Pub. No.: WO2018/044961
PCT Pub. Date: Mar. 8, 2018

(65) Prior Publication Data
US 2019/0199536 A1 Jun. 27, 2019

Related U.S. Application Data

(60) Provisional application No. 62/382,369, filed on Sep. 1, 2016.

(51) Int. Cl.
*H04L 12/10* (2006.01)
*G06F 1/26* (2006.01)
*H02J 7/00* (2006.01)

(52) U.S. Cl.
CPC ............... *H04L 12/10* (2013.01); *G06F 1/26* (2013.01); *H02J 7/0013* (2013.01)

(58) Field of Classification Search
CPC .......... G06F 1/26; H02J 7/0013; H04L 12/10; Y02B 70/30; Y04S 20/20
See application file for complete search history.

(56) References Cited

U.S. PATENT DOCUMENTS 8,214,680 B1 * 7/2012 Tassinari ................. H04L 12/10
713/340
2005/0243861 A1 * 11/2005 Elkayam ................. H04L 12/10
713/300

(Continued)

FOREIGN PATENT DOCUMENTS

EP 2701338 A1 2/2014

OTHER PUBLICATIONS

International Bureau, "International Preliminary Report on Patentability from PCT Application No. PCT/US2017/049241 dated Mar. 5, 2019", from Foreign Counterpart to U.S. Appl. No. 16/329,649, pp. 1-13, Published: WO.

(Continued)

*Primary Examiner* — Jaweed A Abbaszadeh
*Assistant Examiner* — Brian J Corcoran
(74) *Attorney, Agent, or Firm* — Fogg & Powers LLC

(57) ABSTRACT

A direct current (DC) power distribution system is provided. The system includes a passive splitter and an active splitter. The passive splitter includes an input port that is configured to receive a first DC power input and multiple output ports that are configured to provide a first DC power outputs to corresponding ones of multiple power only devices. The active splitter includes an input port that is configured to receive a second DC power input and network data corresponding to at least one network communications data channel and multiple output ports that are configured to provide second DC power outputs and network communications data to corresponding power and/or data devices.

23 Claims, 13 Drawing Sheets

(56) References Cited

U.S. PATENT DOCUMENTS

| | | | |
|---|---|---|---|
| 2006/0053324 A1* | 3/2006 | Giat | H04L 12/10 |
| | | | 713/300 |
| 2006/0112288 A1* | 5/2006 | Schindler | G06F 1/266 |
| | | | 713/300 |
| 2006/0181459 A1 | 8/2006 | Aekins et al. | |
| 2006/0210057 A1* | 9/2006 | Stanford | H04L 12/10 |
| | | | 379/413 |
| 2007/0083668 A1 | 4/2007 | Kelsey et al. | |
| 2008/0168283 A1* | 7/2008 | Penning | G06F 1/263 |
| | | | 713/310 |
| 2009/0002139 A1 | 1/2009 | Cobb | |
| 2011/0219244 A1 | 9/2011 | Wu et al. | |
| 2013/0219195 A1* | 8/2013 | Picard | G06F 1/305 |
| | | | 713/300 |
| 2014/0369687 A1 | 12/2014 | Jain | |
| 2015/0295732 A1 | 10/2015 | Lai | |
| 2016/0020911 A1 | 1/2016 | Sipes, Jr. et al. | |

OTHER PUBLICATIONS

International Searching Authority, "International Search Report and Written Opinion from PCT Application No. PCT/US2017/049241 dated Dec. 13, 2017", from Foreign Counterpart to U.S. Appl. No. 16/329,649, pp. 1-15, Published: WO.

European Patent Office, "Extended European Search Report from EP Application No. 17847419.3", from Foreign Counterpart to U.S. Appl. No. 16/329,649, filed Dec. 12, 2019, pp. 1-9, Published: EP.

European Patent Office, "Communication pursuant to Article 94(3) EPC from EP Application No. 17847419.3", from Foreign Counterpart to U.S. Appl. No. 16/329,649, filed Mar. 11, 2021, pp. 1 through 5, Published: EP.

* cited by examiner

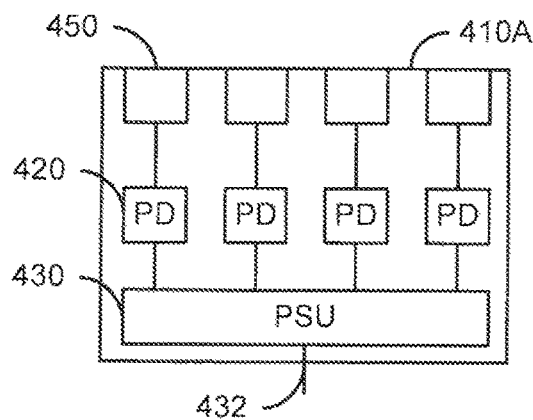
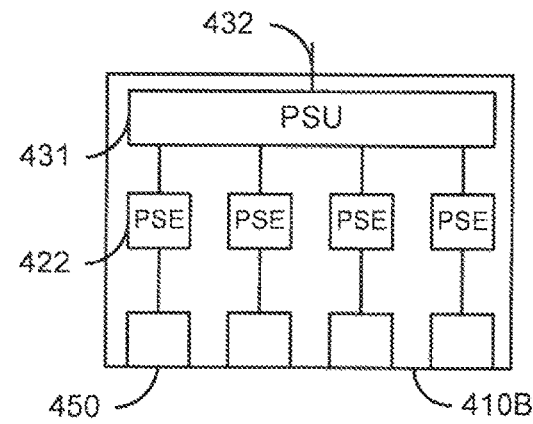
FIG. 9A  FIG. 9B
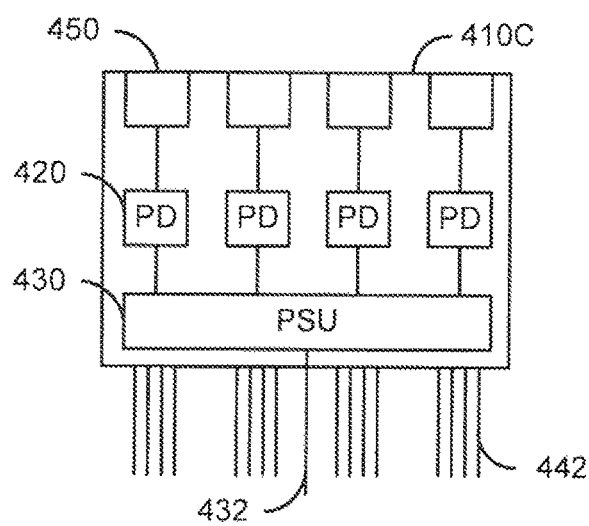
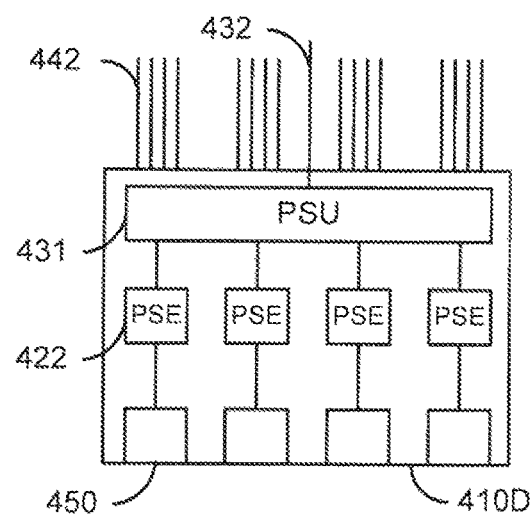
FIG. 9C  FIG. 9D

APPARATUS AND SYSTEMS FOR PROVIDING DC POWER USING COMMUNICATION NETWORKS

CROSS-REFERENCE TO RELATED APPLICATIONS

This application is a U.S. National Stage application of PCT Application Serial No. PCT/US2017/049241, filed on Aug. 30, 2017, which claims the benefit of U.S. Provisional Application Ser. No. 62/382,369, filed on Sep. 1, 2016, the contents of all of which are incorporated herein by reference.

FIELD OF THE INVENTION

The present invention relates generally to communication systems and, more particularly, to providing power in the context of communication panels.

BACKGROUND

A variety of telecommunications equipment is remotely powered today. Examples of remotely powered equipment may include, for example, voice over IP telecommunications equipment, wireless Local Area Network (LAN) access points and network cameras, among others. In some systems, power is delivered to remote equipment over Ethernet segments. Such systems, commonly referred to as power-over-Ethernet (POE) may be typically provided using either of two different methods.

The first method, referred to as an end span, may provide power to remotely powered devices from the actual Ethernet switch. Reference is now made to FIG. 1, which is a block diagram illustrating an endspan system for providing POE in accordance with conventional methods. An endspan POE network switch 10 is communicatively coupled to a network patch panel 14. The endspan POE network switch 10 is configured to provide data communications and/or power via POE to remotely connected network devices that are connected directly or indirectly to the network patch panel 14. A variety at remotely powered network devices may be connected to the network patch panel 14 including, for example, an IP telephone 16, a wireless LAN access point 18, and/or a network camera 20, among others. Upgrading to a system as illustrated in FIG. 1 may require replacing existing non-POE capable switches with POE capable switches 10.

Another method, referred to as midspan, may include a POE component placed between the Ethernet switch and a network patch panel 14. For example reference is now made to FIG. 2, which is a block diagram illustrating a midspan system for providing POE in accordance with conventional methods. A network switch 11 is communicatively coupled to a midspan POE 12. In some systems the midspan POE may replace the network patch panel 14. The midspan POE 12 includes POE functionality configured to provide power to remotely connected network devices. A variety of remotely powered network devices may be connected to the midspan POE 12 including, for example, an IP telephone 16, a wireless LAN access point 18, and/or a network camera 20, among others. Upgrading to a system as illustrated in FIG. 2 may require providing additional equipment, such as a midspan POE 12, to achieve POE functionality.

While conventional POE specifications may provide a framework for delivery of power to typical network devices, conventional solutions do not address an increase in direct current loads that are not networked.

SUMMARY

Embodiments of the present invention include a direct current (DC) power distribution system comprising a passive splitter that comprises an input port that is configured to receive a first DC power input, and a plurality of output ports that are configured to provide a first plurality of DC power outputs to corresponding ones of a plurality of power only devices. The system includes an active splitter that comprises an input port that is configured to receive a second DC power input and network data corresponding to at least one network communications data channel, and a plurality of output ports that are configured to provide a second plurality of DC power outputs and network communications data to corresponding ones of a plurality of power and/or data devices.

In some embodiments, the input port of the passive splitter is configured to receive the first DC power input via at least one pair of conductors in a network communication cable.

Some embodiments provide that the input port of the passive splitter is configured to receive the first DC power input and a third DC power input over respective pairs of conductors in a network communication cable. In some embodiments, the first and third DC power inputs include a same power capacity and have a same voltage. Some embodiments provide that the passive splitter further comprises a power combining circuit that is operable to receive the first and third DC power inputs and to provide a combined internal DC power output. In some embodiments, the passive splitter further comprises a power conversion circuit that is configured to receive the combined internal DC power output and to generate at least one of the first plurality of DC power outputs that are provided to corresponding ones of the plurality of output ports. In some embodiments, the power conversion circuit comprises a DC to DC conversion circuit that generates the at least one of the first plurality of DC power outputs at a different respective voltage than that of the combined internal DC power output.

Some embodiments provide that ones of the plurality of output ports in the passive splitter include at least two different connector types, voltage levels of corresponding ones of the first plurality of DC power outputs is determined based on the respective connector types, and the voltage levels of at least two of the first plurality of DC power outputs are different from one another.

In some embodiments, ones of the plurality of output ports are configured to provide different amounts of power to respective ones of the plurality of DC power outputs.

Some embodiments include a communications network switch that includes a plurality of switch output ports and provide that a first switch output port of the plurality of switch output ports is configured to provide the first DC power input to the passive splitter using a first network communication cable and a second switch output port of the plurality of switch output ports is configured to provide the second DC power input to the active splitter using a second network communication cable.

In some embodiments, the input port of the passive splitter is further configured to receive a third DC power input and the first switch output port is further configured to provide the third DC power input to the passive splitter over respective pairs of conductors in the first network communication cable. Some embodiments provide that the communications network switch provides two power circuits at each of the plurality of switch output ports, the each of the plurality of switch output ports is configured to receive a network communication cable that includes four pairs of conductors, and a first one of the two power circuits is conducted via a first two pairs of the four pairs of conductors and a second one of the two power circuits is conducted via a second two pairs of the other one of the two power circuits.

In some embodiments, the second switch output port of the plurality of switch output ports is configured to provide network data to the active splitter over the second network communication cable. Some embodiments provide that the input port of the active splitter is further configured to receive a fourth DC power input and the second switch output port is further configured to provide the fourth DC power input to the active splitter over respective pairs of conductors in the second network communication cable.

In some embodiments, the passive splitter further comprises a DC power controller that is configured to determine power requirements corresponding ones of the plurality of power only devices connected to ones of the plurality of output ports. In some embodiments, the DC power controller is further configured to monitor power usage at each of the plurality of output ports.

Some embodiments provide that the plurality of output ports comprise a plurality of modular output ports that are selected and installed to provide a given combination of output ports having selected ones of different connector types, voltage levels and/or power capacities.

In some embodiments, the passive splitter comprises a plurality of passive splitters that are configured to receive DC power inputs via respective input ports and that are configured to provide respective pluralities of DC power outputs to corresponding ones of power only devices. Some embodiments include a communications network switch that includes a plurality of switch output ports and provide that each of the plurality of passive splitters is coupled to a respective one of the plurality of switch output ports to receive the corresponding DC power input to the respective passive splitter from the communications network switch using first network communication cables. In some embodiments, the active splitter is coupled to another one of the plurality of switch output ports of the communications network switch to receive the DC power input and the network data using a second network communication cable.

Some embodiments include a communications network switch that includes a plurality of switch output ports. In some embodiments, a first one of the plurality of passive splitters is coupled to one of the plurality of switch output ports to receive the corresponding DC power input to the passive splitter using a first network communication cable and a second one of the plurality of passive splitters is coupled to one of the plurality of output ports of the first passive splitter using a second network communication cable.

Some embodiments provide that at least one of the first plurality of DC power outputs is configured to be connected to one of the plurality of power only devices, wherein the second one of the plurality of passive splitters comprises a second plurality of DC power outputs, and wherein at least one of the second plurality of DC power outputs is configured to be connected to another one of the plurality of power only devices.

In some embodiments, the passive splitter further comprises an electrical energy storage device that is operable to store electrical energy for the passive splitter. Some embodiments provide that the passive splitter further comprises a stored power port that is coupled to the electrical energy storage device and that is configured to receive electrical power into the passive splitter therefrom. In some embodiments, the passive splitter further comprises an electrical power generator that is coupled to the electrical energy storage device and that is configured to generate electrical energy for storing in the electrical energy storage device.

Some embodiments provide that the active splitter further comprises an electrical energy storage device that is operable to store electrical energy for the active splitter. In some embodiments, the active splitter further comprises a stored power port that is coupled to the electrical energy storage device and that is configured to receive electrical power into the active splitter therefrom. Some embodiments provide that the active splitter further comprises an electrical power generator that is coupled to the electrical energy storage device and that is configured to generate electrical energy for storing in the electrical energy storage device.

Some embodiments of the present invention include a direct current (DC) power distribution panel that includes at least one jack that is configured to receive DC power via a first network communication cable that provides at least one power signal from a first communication network switch and a plurality of DC power output ports that are each configured to transmit DC power to a remote device via at least a second network communication cable.

In some embodiments, the at least one power signal comprises a first power signal that is received using at least a first pair of conductors in the first network communication cable and a second power signal that is received using at least a second pair of conductors in the first network communication cable. Some embodiments include a power combining circuit that is configured to receive the first and second power circuits and to generate a combined internal DC power output. Some embodiments include a power conversion circuit that is configured to receive the combined internal DC power output, to generate at least one of the first plurality of DC power outputs, and provide at least one of the first plurality of DC power outputs to a corresponding one of the plurality of DC power output ports. In some embodiments, the power conversion circuit comprises a DC to DC conversion circuit that generates the, at least one of the first plurality of DC power outputs at a different respective voltage than that of the combined internal DC power output.

In some embodiments, ones of the plurality of output ports in the panel include at least two different connector types, voltage levels of corresponding ones of the first plurality of DC power outputs is determined based on the respective connector types, and the voltage levels of at least two of the first plurality of DC power outputs are different from one another. In some embodiments, ones of the plurality of output ports are configured to provide respective ones of the plurality of DC power outputs at different power quantities.

Some embodiments of the present invention include a direct current (DC) power distribution panel that includes at least one jack that is configured to receive DC power via a first network communication cable that provides at least one power circuit front a first communication network switch and network communications data to at least one network device and a plurality of DC power output ports that are each configured to transmit DC power and network communications data to the at least one network device via at least a second network communication cable.

In some embodiments, the plurality of DC power output ports includes power only ports that are each configured to transmit DC power without data to power only devices and power plus data ports that are configured to transmit the DC power and network communications data to the at least one network device.

Some embodiments provide that the at least one power circuit comprises a first power circuit that is received using at least a first pair of conductors in the first network communication cable and a second power circuit that is received using at least a second pair of conductors in the first network communication cable.

Some embodiments include a power combining circuit that is configured to receive the first and second power circuits and to generate a combined internal DC power output. Some embodiments include a power conversion circuit that is configured to receive the combined internal DC power output and to generate at least one of the first plurality of DC power outputs to corresponding ones of the plurality of DC power output ports. Some embodiments provide that the power conversion circuit comprises a DC to DC conversion circuit that generates the at least one of the first plurality of DC power outputs at a different respective voltage than that of the combined internal DC power output.

In some embodiments, ones of the plurality of output ports in the panel include at least two different connector types, voltage levels of corresponding ones of the first plurality of DC power outputs is determined based on the respective connector types, and the voltage levels of at least two of the first plurality of DC power outputs are different from one another.

In some embodiments, ones of the plurality of output ports are configured to provide respective ones of the plurality of DC power outputs at different power quantities.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

FIGS. 9A-9D are a block diagrams illustrating different DC power distribution system port modules that may be used to configure the DC power distribution system component 400 discussed above with reference to FIG. 8.

DETAILED DESCRIPTION

Figure 1:
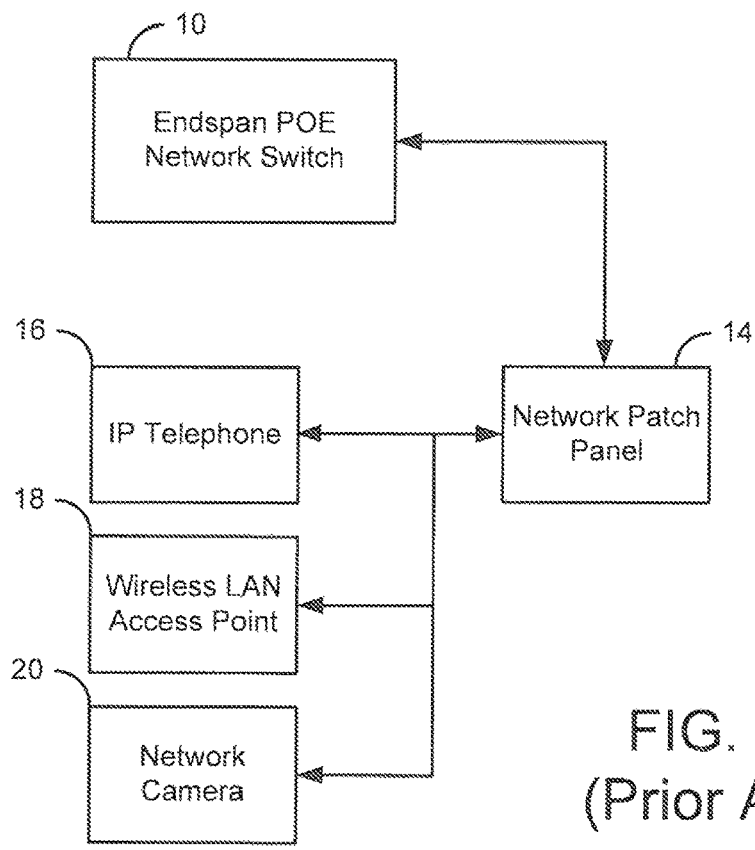
FIG. 1 is a block diagram illustrating a system for providing power over Ethernet in accordance with conventional methods.
Figure 2:
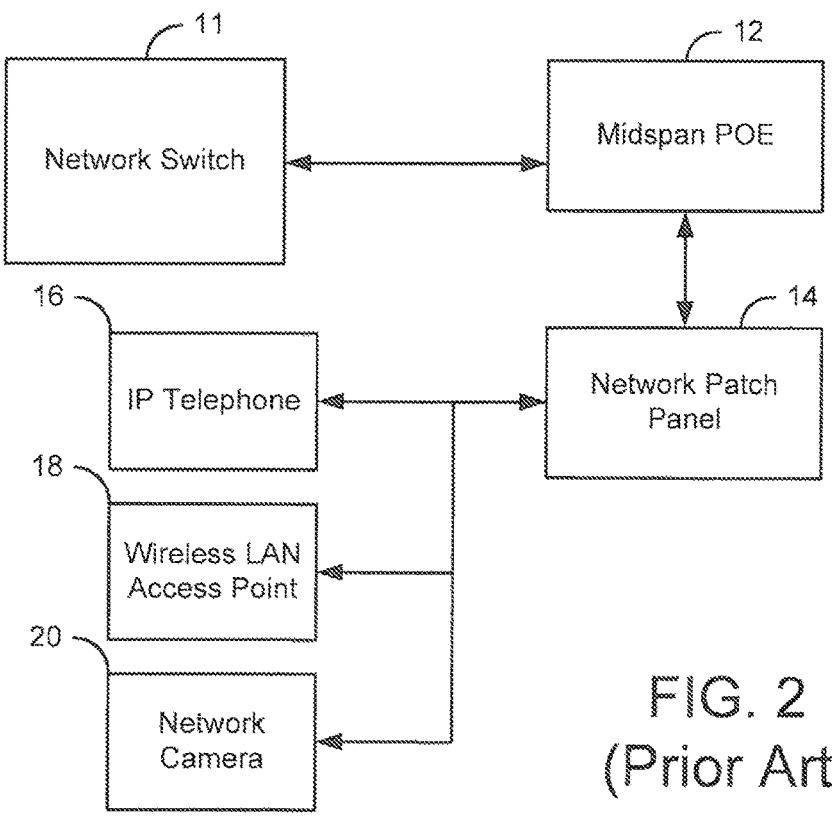
FIG. 2 is a block diagram illustrating another system for providing power over Ethernet in accordance with conventional methods.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

This invention is directed to communications panels, with a primary example of such being a patch panel. As used herein, the terms "forward", "forwardly", and "front" and derivatives thereof refer to the direction defined by a vector extending from the center of the panel toward the face of the panel that includes the plug openings for the patch panel jacks. Conversely, the terms "rearward", "rearwardly", and derivatives thereof refer to the direction directly opposite the forward direction; the rearward direction is defined by a vector that extends away from the face of the panel that includes the plug openings for the patch panel jacks. Where used, the terms "attached", "connected", "interconnected", "contacting", "mounted" and the like can mean either direct or indirect attachment or contact between elements, unless stated otherwise.

Figure 3:
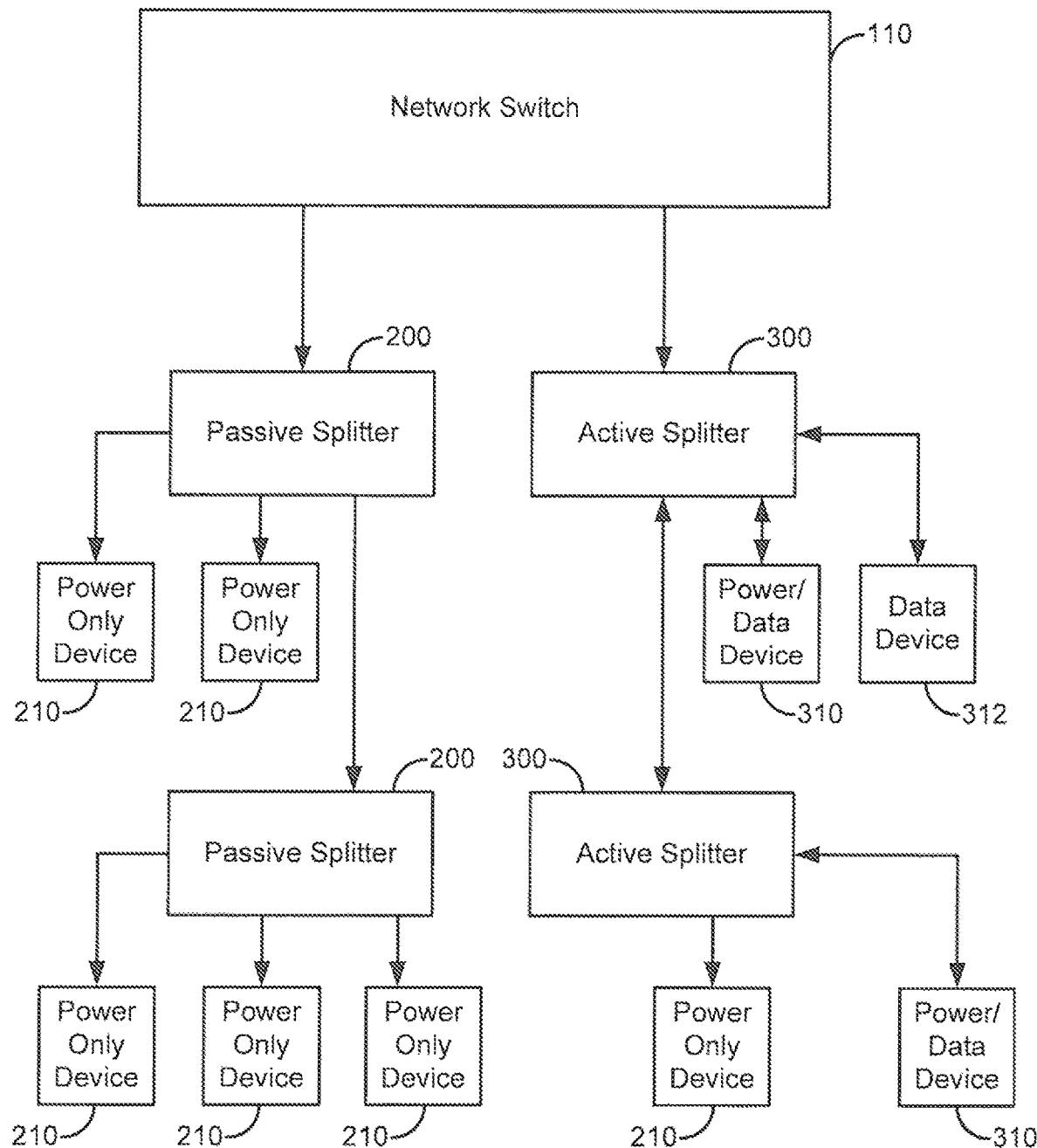
FIG. 3 is a block diagram illustrating a system for providing DC power distribution in accordance with some embodiments of the present invention.

Reference is now made to FIG. 3, which is a block diagram illustrating a system for providing distributed DC power in accordance with some embodiments of the present invention. The system includes a network switch 110 that is communicatively coupled to a passive splitter 200 and an active splitter 300. The passive splitter 200 may receive DC power from the network switch 110 and may distribute the DC power to one or more power only devices 210. In some embodiments, the passive splitter 200 is configured to provide DC power to one or more other passive splitters 200 that may further distribute the DC power to other power only devices 210. Examples, of power only devices 210 include charging stations and/or portable electronic devices to be charged, lighting, such as LED office lighting, multimedia equipment, such as monitors, projectors, intercoms and the like, and/or wireless devices such as WiFi cameras, and/or WiFi extenders, among others.

The system may also include one or more active splitters 300. According to some embodiments, an active splitter 300 may provide substantially all of the power distribution functionality of the passive splitter 200. Additionally, the active splitter 300 may further provide data communications between different network devices and/or between the network switch 110 and multiple different power/data devices 310 and/or data devices 312. Some embodiments provide that power/data devices 310 may include devices that may be powered and that may receive data from the active splitter 300. Examples of such devices include any wired network connected computing devices, wired cameras, WiFi access points, network switching and/or routing devices, and/or network based telephonic devices, among others. In some embodiments, an active splitter 300 may provide power and/or data to another active splitter 300 and/or passive splitter 200, that may then be provided to power only devices 210, data devices 312 and/or power/data devices 310.

Figure 4:
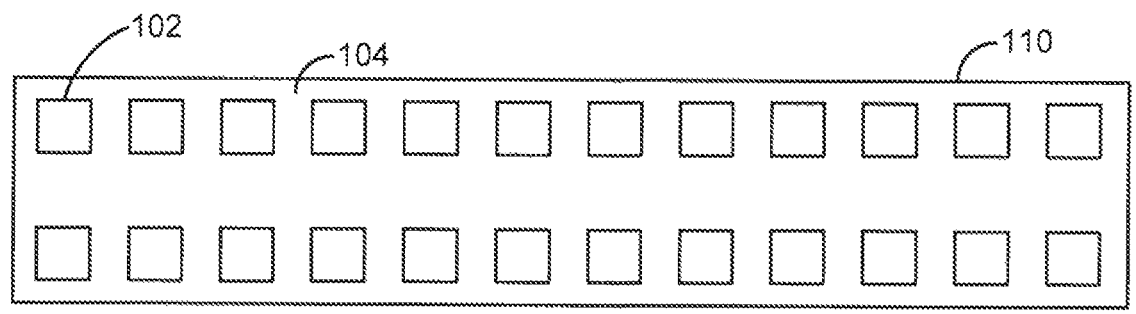
FIG. 4 is a front schematic view illustrating a network switch in a system for providing DC power distribution in accordance with some embodiments of the present invention.

FIG. 4 is a front schematic view illustrating a network switch 110 in accordance with some embodiments of the present invention. Referring to FIG. 4, the network switch 110 includes a front faceplate 104 that includes openings for multiple output ports 102 configured to receive communications cables that may correspond to multiple network segments, such as Ethernet segments. In some embodiments, the output ports 102 may be configured to provide one or more DC voltage power circuits to power only and/or power and data devices. For example, each of the output ports 102 may include a communication jack that corresponds to a specific Ethernet segment where a network component is connected, via a network cable, to the corresponding output port 102. The network switch 110 may include a chassis configured to support and/or retain the various components thereof. The chassis may include any of a variety of mechanical structures configured to provide mounting and/or structural support to the various panel mounted components. For example, in some embodiments, the chassis may be a frame upon which interior and/or exterior panel components are mounted to, supported by or otherwise affixed to. Although illustrated as including 24 output ports 102, in some embodiments, the network switch 110 may be configured to include more or less than 24 output ports 102.

Figure 5:
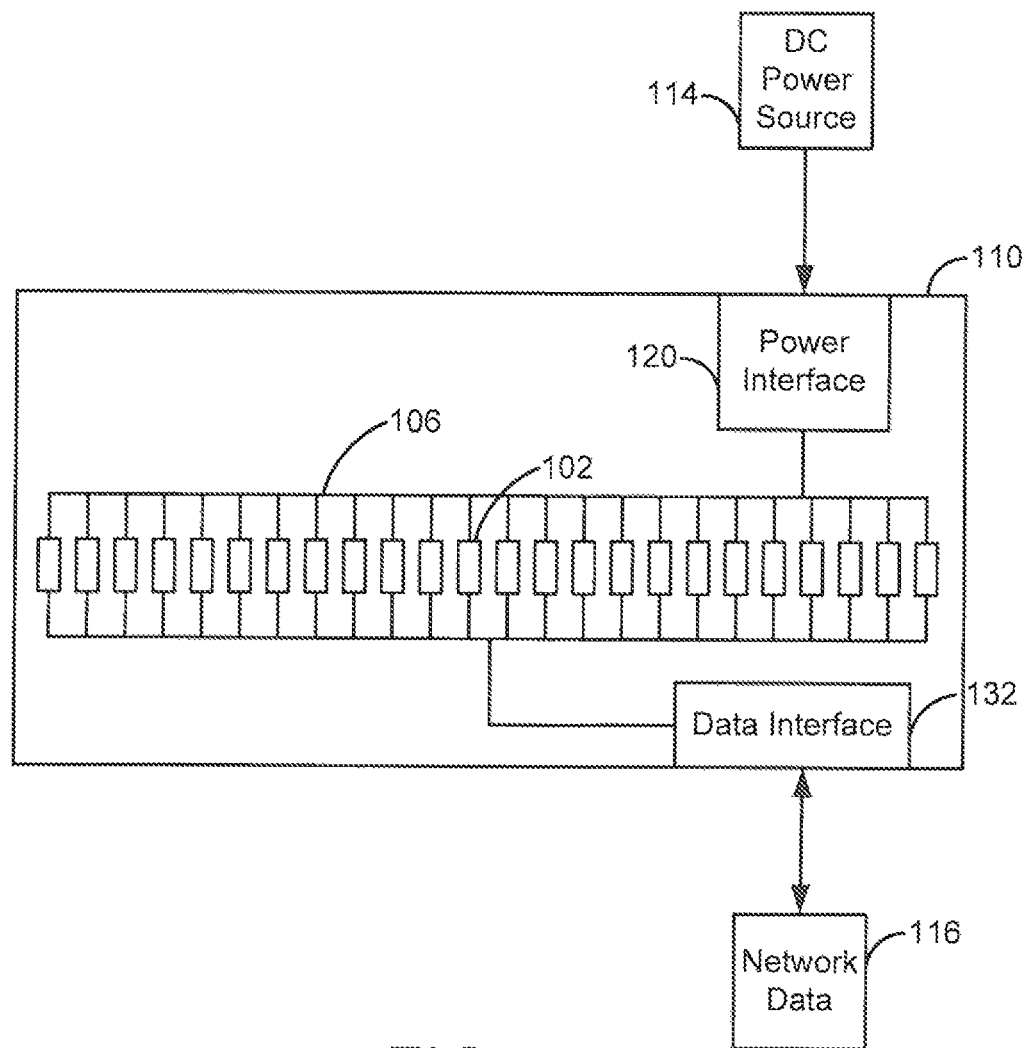
FIG. 5 is a block diagram illustrating a network switch in a system for providing DC power distribution in accordance with some embodiments of the present invention.

Reference is now made to FIG. 5, which is a block diagram illustrating a network switch in accordance with some embodiments of the present invention. The network switch 110 may include the multiple output ports 102 that may provide data and/or power to devices that are connected thereto via corresponding network communication cables. In some embodiments, the network switch 110 includes a power interface 120 that is configured to electrically engage and receive DC power from an external DC power source 114. The power interface 120 may be configured to provide electrical interconnection between the DC power source 114 and some or all of the output ports 102 in the network switch 110.

Although the DC power is schematically illustrated as being provided to the output ports 102 over a common DC power bus 106, the DC power may be provided to each of the output ports 102 using more than one DC power circuit. In some embodiments, the power interface 120 is configured to provide one or more separate DC power signals that may be provided to one or more of the output ports 102. In some embodiments, the power interface 120 may generate an independent DC power signal for each of the multiple output ports 102.

Some embodiments provide that multiple separate DC power signals may be provided to each of the output ports 102. For example, in some embodiments, two different 100 Watt DC power signals may be provided to each output port 102. In such embodiments, each output port 102 may provide the two 100 Watt DC power signals to loads and/or DC power distribution system components via one or more pairs of conductors in a network communication cable. For example, some embodiments provide that two pairs of conductors of a four-pair communication cable may be used to provide each of the 100 Watt DC power signals. Quantities of DC power signals per output port 102 may be more or less than two and may be transmitted on more or less than two pairs of conductors according to embodiments herein. In some embodiments, the DC power signals provided via the output ports 102 may be provided at about 60 Volts DC, however, such embodiments are non-limiting. For example, the DC power signals provided via the output ports 102 may be provided at more or less than about 60 Volts. Some embodiments provide that all of the DC power signals provided via the output ports 102 may be provided at about the same power and/or voltage, however, such embodiments are non-limiting. For example, different ones of the DC power signals provided via the output ports 102 may be provided at different power and/or voltages from one another.

Although illustrated as an external DC power source 114, some embodiments provide that the DC power source 114 may be integrally provided as an internal component to the network switch 110. For example, the network switch 110 may be configured to receive alternating current (AC) power from an external power source and convert the received AC power into one or more DC power signals.

The network switch 110 may be coupled to one or more network data sources and/or components 116 via one or more data interfaces 132. One or more of the output ports 102 may be coupled to the data interface 132 to communicate network data between network devices that are connected to the output ports 102 and the network data sources and/or components 116 via network communication cables.

Although the data interface 132 is illustrated as being connected to all of the output ports 102, some embodiments provide that less than all of the output ports 102 may be configured to communicate data. For example, some or the output ports 102 may be configured as power only output ports that are configured to provide DC power to devices that are connected thereto and not to provide any data. In some embodiments, all of the DC power functionality of the network switch 110 may be provided without any network switching or data capability or functionality and may be provided as a DC power distribution component in a DC power distribution system.

Figure 6:
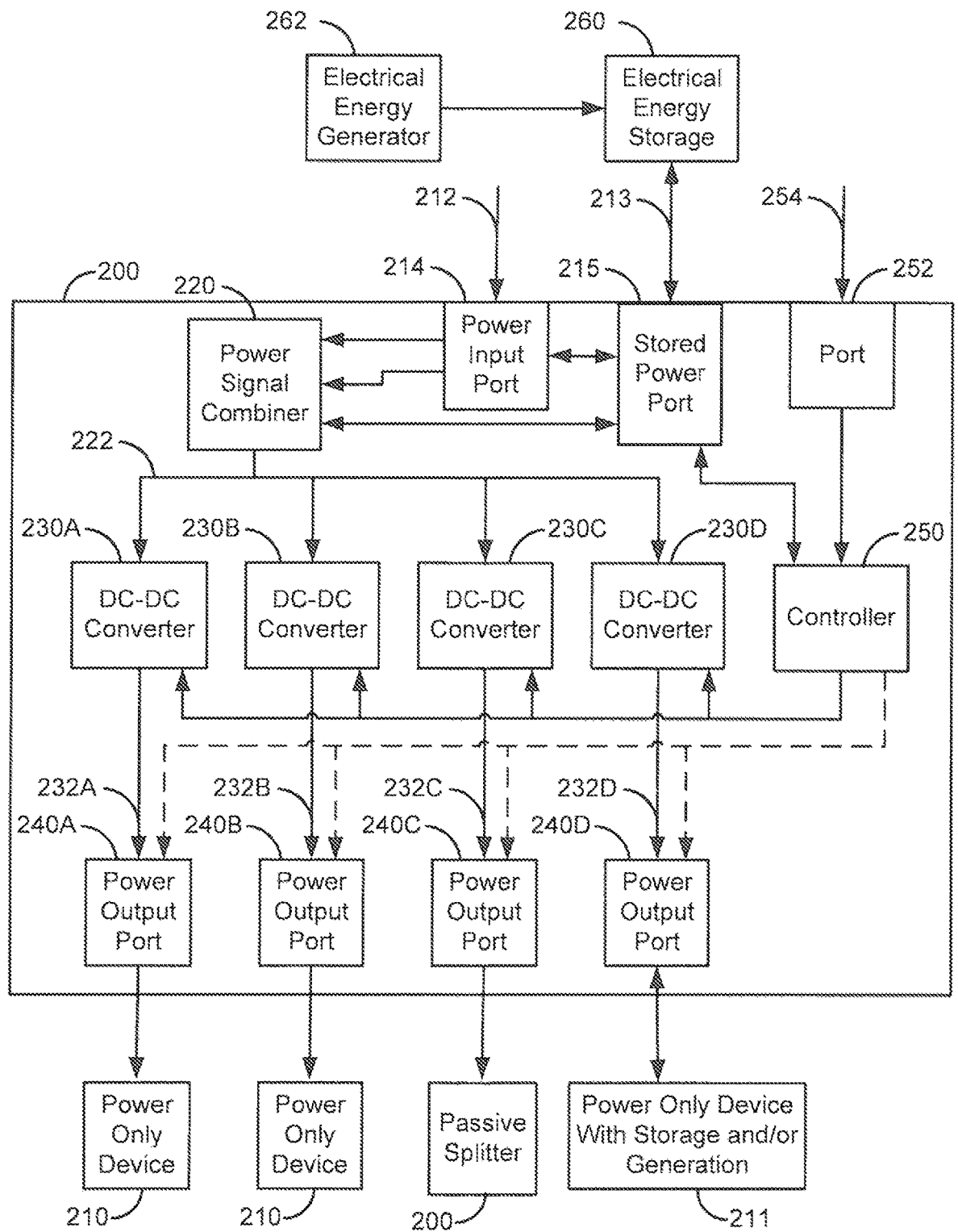
FIG. 6 is a block diagram illustrating a passive splitter in a system for providing DC power distribution in accordance with some embodiments of the present invention.

Reference is now made to FIG. 6, which is a block diagram illustrating a passive splitter in a system for providing DC power distribution in accordance with some embodiments of the present invention. In some embodiments, a passive splitter 200 may include an input port 214, which may also be referred to as a power input port 214. The power input port 214 may receive one or more DC power signals from a DC power distribution system component (not shown here). Some embodiments provide that a DC power distribution system component may include a network switch 110 as described above regarding FIG. 5, however, such embodiments are non-limiting as the DC power signal may be provided by a component that includes no network switching functionality.

In some embodiments, the DC power signal is received over a network communication cable 212, such as, for example, a CAT 5e/6/6a type cable, among others. Some embodiments provide that the network communication cable 212 includes multiple pairs of conductors that may be used to conduct current corresponding to the DC power signal. In some embodiments, a single DC power signal may be transmitted over multiple pairs of conductors of the network communication cable 212. For example, some embodiments provide that the DC power signal may be transmitted over two or more pairs of conductors in the network communications cable 212. Additionally, in some embodiments, multiple DC power signals may be delivered via the network communications cable 212. For example, two DC power signals may be delivered using two pairs of conductors for each of the two DC power signals. In some embodiments, the DC power signals may be 100 Watt DC circuits. Some embodiments provide that the DC power signals are provided at the same DC voltages as one another, however, such embodiments are non-limiting.

In embodiments in which the power input port 214 receives more than one DC power signal, the passive splitter 200 may include a power signal combiner 220 that is configured to combine two or more DC power signals into a fewer number of internal DC power outputs 222. For example, some embodiments provide that the power input port 210 receives two DC power signals and the power signal combiner 220 is configured to combine the two DC power signals into a single internal DC power output 222.

In some embodiments, the internal DC power output 222 may be provided to one or more DC-DC converters 230A-D that are configured to convert the DC voltage of internal DC power output 222 to one or more DC power outputs 232A-D that may have different DC voltages. For example, in an example as illustrated in FIG. 6, four DC-DC converters 230A-D may provide four DC power outputs 232A-D, respectively. Some embodiments provide that the different DC power outputs 232A-D are provided at different voltages from one another, however, some or all of the DC power outputs 232A-D may be provided at the same voltage. Some embodiments provide that the different DC power outputs 232A-D are configured to provide different quantities of power than one another, however, some or all of the DC power outputs 232A-D may be configured to provide the same or substantially the same quantities of power relative to one another.

The DC power outputs 232A-D may be provided to various different DC power system loads via respective ones of power output ports 240A-D. In some embodiments, ones of the power output ports 240A-D may include any of a variety of standardized computer connectors and/or telecommunication network interfaces such as USB 1.x, USB 2.0, USB 3.0, USB 3.1, USB-C, HDMI, Ethernet, RJ45, and/or T568A/T568B, among others. Some embodiments provide that one or more of the DC power outputs 232A-D is configured to be coupled to another passive splitter, which may be substantially the same as the passive splitter 200 and may be used to distribute DC power to other DC power loads. Additionally, although the DC power output ports 232A-D are each illustrated as including a single port, some embodiments provide that multiple physical ports may be present and coupled to each of the DC-DC converters 230A-D. The DC power output ports 240A-D may be coupled to different combinations of power only devices 210 and additional power system distribution equipment, such as other passive splitters 200.

In some embodiments, different ones of and/or groups of the DC power output ports 240A-D may be configurable. In some embodiments, the passive splitter 200 includes a controller 250 that is operable to receive control and/or configuration data corresponding to the desired configuration of the DC power output ports 240A-D. In some embodiments, the control and/or configuration data is received as a control data signal 254 via a port 252, such as a standardized computer connector and/or telecommunication network interface port as discussed above.

Some embodiments provide that the DC power output port 240A-D configuration may be accomplished based on control and/or configuration data that may be delivered to respective ones of the DC-DC converters 230A-D. Although not illustrated, some embodiments provide that the DC power output port 240A-D configuration may be accomplished based on control and/or configuration data that may be delivered to respective ones of the DC power output ports 240A-D.

Although illustrated as individual components, functions corresponding to the power signal combiner 220, the DC-DC converters 230A-D, and/or controller 250 may be combined into integrated components that perform multiple ones of the functions.

In some embodiments, the passive splitter 200 may include a stored power port 215 that is operable to receive electrical energy from an electrical energy storage device 260. Examples of an electrical energy storage device 260 may include one or more batteries and/or capacitors, among others. The electrical energy storage device 260 may transfer electrical energy to and/or from the stored power port 215 via an electrically conductive structure 213 such as a cable, wire, bus bar, pin, plug, lug, terminal and/or other conductive structure that is provided between the stored power port 215 and the electrical energy storage 260.

Some embodiments provide that the electrical energy storage device 260 may include a battery and may be used to provide load balancing corresponding to differences between peak power usage and average power usage of load devices. For example, in a configuration in which 50 Watts of continuous electrical power is available and one or more load devices, alone or in combination, may have an average power usage that is less than 50 Watts, but require instantaneous power that exceeds the 50 Watts for short durations, the battery may provide the additional electrical power that exceeds the available 50 Watts. During the times that the combination of load devices consume less than the 50 Watts, the battery may be in a charging mode. In this manner, the battery may narrow the continuous power requirement to a value that is closer to the average power requirement instead of the peak power requirement.

Some embodiments provide that the electrical energy storage device 260 may provide electrical energy for a period of time in which the DC power signal is not provided to the power input port 214. For example, in embodiments in which the electrical energy storage device 260 is a capacitor, the period of time that back-up power is available may be relatively short, for example, a few seconds, minutes, or less. In embodiments in which the electrical energy storage device is a battery, the period of time that back-up power is available may be longer, such as several or more minutes or hours.

Some embodiments may provide that at least a portion of the electrical energy stored in the electrical energy storage device 260 is provided by the DC power signal that is provided to the power input port 214 of the passive splitter 200. In some embodiments, at least a portion of the electrical energy stored in the electrical energy storage device 260 is received from an electrical energy generator 262. For example, in some embodiments, the electrical energy generator 262 may be operable to generate electrical energy from energy sources in the environment, such as kinetic energy from moving mass such as air and/or water, radiant energy such as electromagnetic radiant energy, including light energy, and/or thermal energy, among others. For example, in some embodiments the electrical energy generator 262 is a photovoltaic cell that is operable to convert electromagnetic radiant energy into electrical energy.

As illustrated, some embodiments provide that the electrical energy storage device 260 may be a separate device relative to the passive splitter 200. However, in some embodiments, the electrical energy storage device 260 may be provided as an integral component of the passive splitter 200.

Some embodiments provide that the electrical energy generator 262 may be provided as a separate device from the electrical energy storage device 260 and/or the passive splitter 200. However, some embodiments provide that the electrical energy generator 262 may be an integral component of the passive splitter 200 and/or the electrical energy storage device 260.

In addition to power only devices 210 and additional power system distribution equipment, such as other passive splitters 200, connected devices may include power only devices with electrical energy storage and/or generation 211. In such embodiments, one or more of the connected devices (e.g., power only devices with electrical energy storage and/or generation 211) may be operable to generate and/or store electrical energy that may be used to supplement and/or replace the power provided by the passive splitter 200. Some embodiments provide that the power only devices with electrical energy storage and/or generation 211 may provide the passive splitter 200 with electrical energy to accomplish electrical load balancing corresponding to the difference between the electrical power provided to the passive splitter 200 and the electrical load requirements of different ones of the connected electrical loads. As discussed above regarding the electrical energy storage device 260 and the electrical energy generator 262, the electrical energy storage and/or electrical energy generation components in the power only device with electrical energy storage and/or generation 211 may be provided integrally as one or more combined devices and/or separately as different devices.

Figure 7:
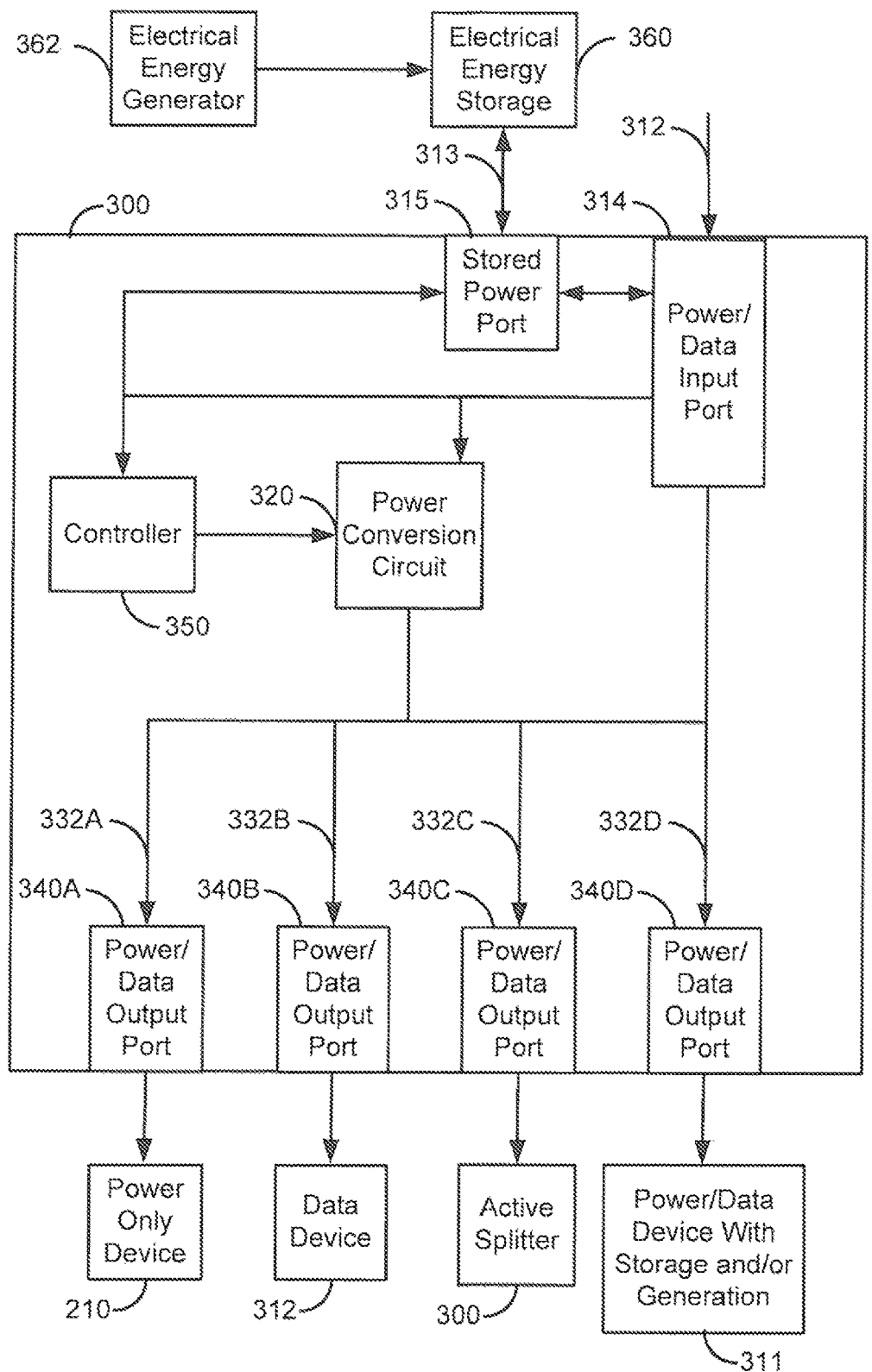
FIG. 7 is a block diagram illustrating an active splitter in a system for providing DC power distribution in accordance with some embodiments of the present invention.

Reference is now made to FIG. 7, which is a block diagram illustrating an active splitter 300 in a system for providing DC power distribution in accordance with some embodiments of the present invention. Some embodiments provide that an active splitter 300 may provide substantially all of the power distribution functionality of the passive splitter 200. For example, the active splitter 300 may include a power conversion circuit 320 that may include functionality and/or components corresponding to the power signal combiner 220, DC-DC converters 230A-D, and/or the controller 250, among others.

Additionally, the active splitter 300 may further provide data communications between different network devices and/or between a network switch 110 and multiple different power/data devices 310 and/or data devices 312. Some embodiments provide that power/data devices 310 may include devices that may be powered and that may receive and/or transmit data from/to the active splitter 300.

In some embodiments, an active splitter 300 may include an input port 314, which may also be referred to as a power/data input port 314. The power/data input port 314 may receive one or more DC power signals from a DC power distribution system component (not shown here) using a network communications cable 312. The power/data input port 314 may be further configured to receive/transmit communication and/or computer network data using the network communications cable 312 from/to other network devices and/or networks. For example, two DC power signals may be delivered using two pairs of conductors for each of the two DC power signals and the two pairs of conductors may also be used for receiving and transmitting data. Although illustrated as a single power/data input port 314, embodiments may include multiple power/data input ports 314 that are configured to receive one or more DC power signals and/or one or more network communication data signals.

In some embodiments, the DC power signal and data are received over a network communication cable 312, such as, for example, a CAT 5e/6/6a type cable, among others. In some embodiments, a distance between DC power distribution network devices may be too long for reliable high-speed data transmission over the electrical conductors in a network communication cable. In such embodiments, a network communications cable may include a hybrid cable including electrical conductors and/or pairs thereof and one or more optical fibers. The electrical conductors may transmit one or more DC power signals and the optical fibers may transmit data using light signals.

Some embodiments provide that the network communication cable 312 includes multiple pairs of conductors that may be used to conduct current corresponding to the DC power signal. In some embodiments, a single DC power signal may be transmitted over multiple pairs of conductors of the network communication cable 312. For example, some embodiments provide that the DC power signal may be transmitted over two or more pairs of conductors in the network communications cable 312. Additionally, in some embodiments, multiple DC power signals may be delivered via the network communications cable 312.

The active splitter 300 may include a DC power controller 350 that may receive DC power configuration data via the power/data input port 314. The DC power controller 350 may use the DC power configuration data to configure the power characteristics corresponding to each of the power/data output ports 340A-D. For example, one or more power/data output ports 340A may be configured to provide a DC power signal to a power only device 210 at a given power rating and at a given DC voltage. In some embodiments, the given power rating may include a Watts value and/or a DC voltage value that corresponds to a particular class of power only devices 210. Similarly, one or more power/data output ports 340B may be configured to provide no DC power to a data only device 312. Some embodiments provide that one or more a power/data output ports 340C may be configured to provide a DC power signal and one or more network data channels to another active splitter 300. In some embodiments, one or more power/data output ports 340D may be configured to provide a DC power signal and one or more network data channels to a power/data device 310.

Some embodiments provide that the power/data input port 314 receives one or more DC power signals that may be transmitted to a power conversion circuit 320. In some embodiments, the power conversion circuit 320 is configured to combine two or more DC power signals internally and to generate one or more DC power outputs 332A-D. While illustrated as a single power conversion circuit 320, embodiments described herein may include multiple power conversion circuits 320 that may correspond to one and/or a portion of the power/data output ports 340A-D.

Some embodiments provide that the different DC power outputs 332A-D are provided at different voltages from one another, however, some or all of the DC power outputs 332A-D may be provided at the same voltage. Some embodiments provide that the different DC power outputs 332A-D are configured to provide different quantities of power than one another, however, some or all of the DC power outputs 332A-D may be configured to provide different quantities of power relative to one another.

The DC power outputs 332A-D may be provided to various different DC power system loads via respective ones of power/data output ports 340A-D. In some embodiments, ones of the power output ports 340A-D may include any of a variety of standardized computer connectors and/or telecommunication network interfaces such as USB 1.x, USE 2.0, USB 3.0, USB 3.1, USB-C, HDMI, Ethernet, RJ45, and/or T568A/T568B, among others. Some embodiments provide that one or more of the DC power outputs 332A-D is configured to be coupled to a passive splitter 200, which may be used to distribute DC power to other DC power loads. Additionally, although the DC power/data output ports 332A-D are each illustrated as including a single port, some embodiments provide that multiple physical ports may be present.

The active splitter 300 may include a stored power port 315, electrically conductive structure 313, and electrical energy storage device 360, an electrical energy generator 362 and/or a power/data device with storage and/or generation 311 that each include functionality corresponding to the stored power port 215, electrically conductive structure 213, and electrical energy storage device 260, an electrical energy generator 262 and/or a power/data device with storage and/or generation 211 discussed above regarding FIG. 6. As such, repeated discussion thereof will be omitted for brevity.

Figure 8:
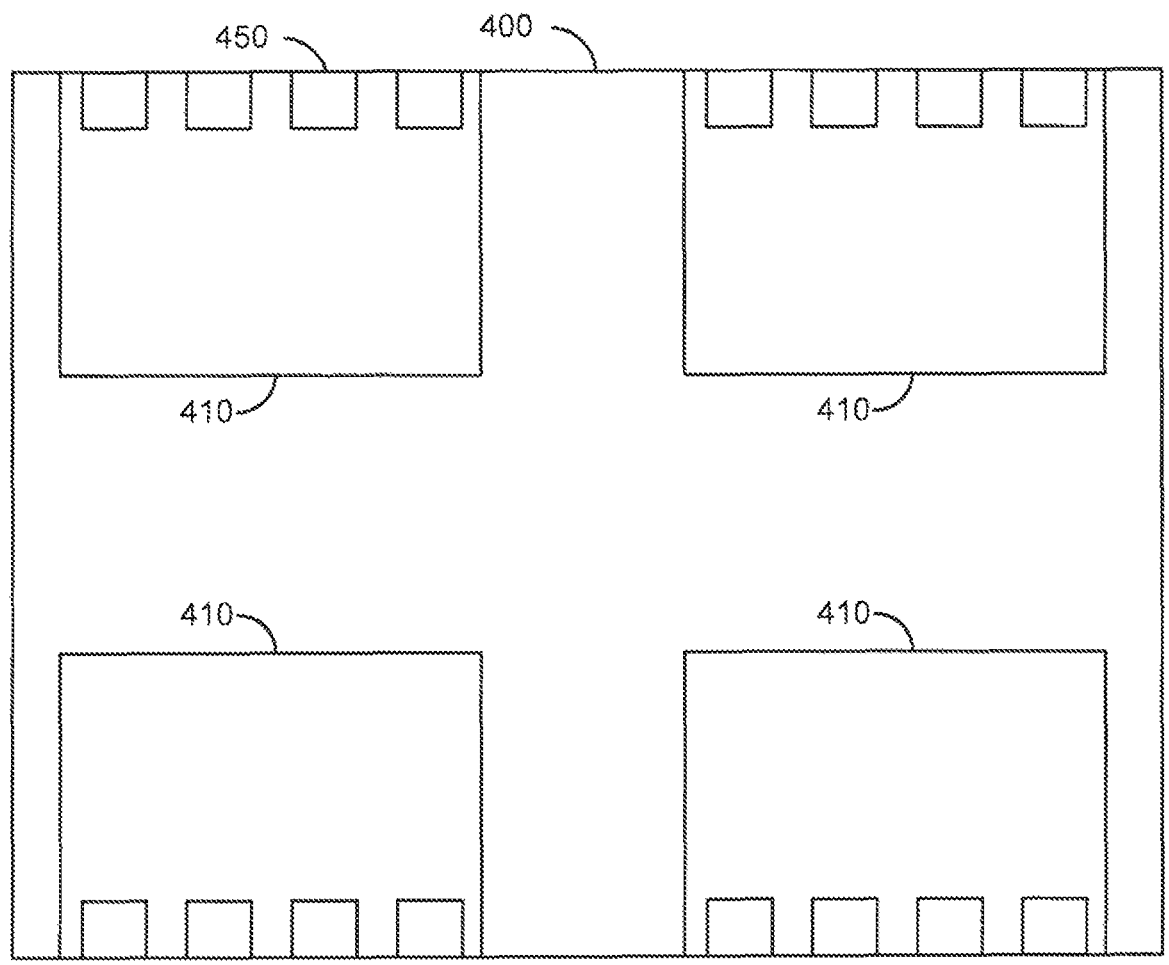
FIG. 8 is a block diagram of a DC power distribution system component in accordance with some embodiments of the present invention.

Brief reference is now made to FIG. 8, which is a block diagram of a DC power distribution system component in accordance with some embodiments of the present invention. In some embodiments, the DC power distribution system component 400 may be configured as an active or passive splitter. The DC power distribution system component 400 may be configured to include a plurality of port modules 410 that each include one or more ports 450. Some embodiments provide that the configuration of the DC power distribution system component 400 may be determined by selecting different port modules 410 and/or types thereof based on desired functionality. In this manner, a DC power distribution system component 400 may be provided to address specific DC power distribution system requirements by selecting and combining specific ones of different port modules 410 and/or types thereof.

Reference is now made to FIGS. 9A-9D, which are a block diagrams illustrating different DC power distribution system port modules that may be used to configure the DC power distribution system component 400 discussed above regarding FIG. 8. Referring to FIG. 9A, some embodiments provide that a DC power distribution system port module may be a power only device module 410A that includes communication jacks 450, such as RJ-45 or USB-C, among others, that are configured to receive one or more DC power signals from a DC power source and/or another DC power distribution system component. The received DC power signal may be received by one or more powered device circuits 420. The outputs from the powered device circuits 420 may be received by a power supply unit 430, which may combine and/or modify received DC power signals and generate a combined internal DC power output 432.

Reference is now made to FIG. 9B, which illustrates a power only source module 410B. The power only source module 410B includes a power supply unit 431 that is configured to receive the combined internal DC power output signal 432 and to generate one or more DC power signals that may be provided to communication jacks 450 via power sourcing equipment circuits 422. Thus, a power only DC power distribution system component may be configured using at least one power only device module 410A and at least one power only source module 410B.

Referring to FIG. 9C, some embodiments provide that a DC power distribution system port module may be a power and data device module 410C that includes communication jacks 450, such as RJ-45 or USB-C, among others, that are configured to receive one or more DC power signals from a DC power source and/or another DC power distribution system component. The received DC power signal may be received by one or more powered device circuits 420. The communication jacks 450 may also be configured to receive one or more channels of data 442. The outputs from the powered device circuits 420 may be received by a power supply unit 430, which may combine and/or modify received DC power signals and generate a combined internal DC power output 432. The data 442 may be switched and/or passed through the power and data device module 410C to other modules in the DC power distribution component 400.

Reference is now made to FIG. 9D, which illustrates a power and data source module 410D. The power and data source module 410D includes a power supply unit 431 that is configured to receive the combined internal DC power output signal 432 and to generate one or more DC power signals that may be provided to communication jacks 450 via power sourcing equipment circuits 422. The communication jacks 450 may also be configured to transmit one or more channels of data 442 from sources within the DC power distribution component 400 to power/data devices via the communication jacks 450. Thus, a power/data DC power distribution system component may be configured using at least one power and data device module 410C and at least one power and data source module 410D. In some embodiments, a DC power distribution system component may include various combinations of modules 410A-D, depending on the desired configuration.

Figure 10:
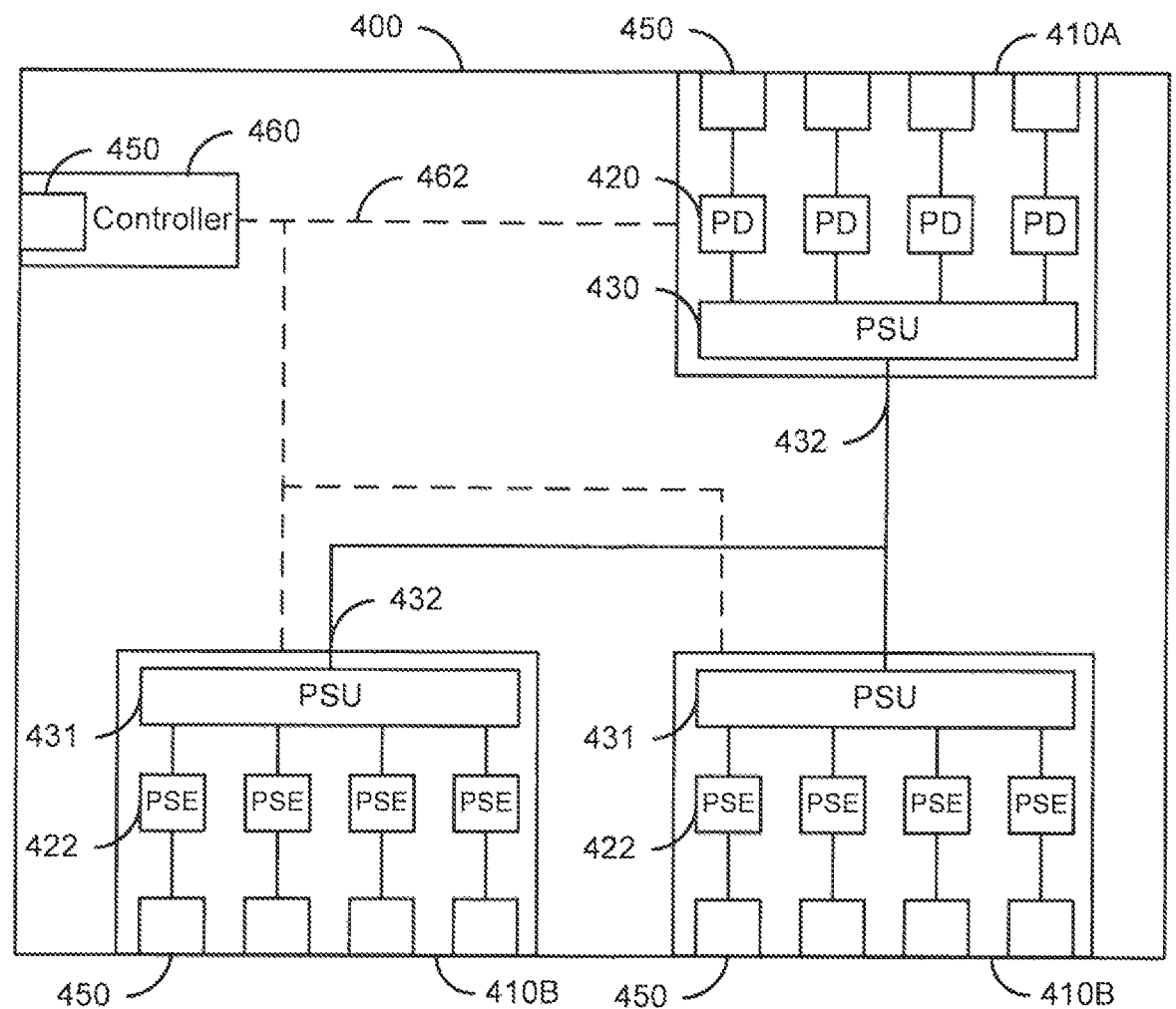
FIG. 10 is a block diagram illustrating a DC power distribution system component using DC power distribution system port modules in accordance with some embodiments of the present invention.

Reference is now made to FIG. 10, which is a block diagram illustrating a DC power distribution system component using DC power distribution system port modules in accordance with some embodiments of the present invention. A DC power distribution system component 400 according to some embodiments may be configured as a smart passive splitter. For example, the DC power distribution system component 400 may include a DC power distribution system port module 410A that includes communication jacks 450, such as RJ-45 or USB-C, among others, that are configured to receive one or more DC power signals into one or more powered device circuits 420. The outputs from the powered device circuits 420 may be received by a power supply unit 430, which may combine and/or modify received DC power signals and generate a combined internal DC power output 432.

Some embodiments provide that the DC power distribution system component 400 may further include one or more a power only source modules 410B that each may include a power supply unit 431 that is configured to receive the combined internal DC power output signal 432 and to generate one or more DC power signals that may be provided to communication jacks 450 via power sourcing equipment circuits 422.

The DC power distribution system component 400 may further include a controller 460 that is operable to receive control and/or configuration data corresponding to the desired configuration of the power only source modules 410B and/or the DC power distribution system port module 410A. In some embodiments, the control and/or configuration data is received as a control data signal via a communication jack 450, such as RJ-45 or USB-C, among others. The controller 460 may send an internal control and/or configuration signal 462 to the power only source modules 410B and/or the DC power distribution system port module 410A. In this manner, one or more of the communication jacks 450 may, be configured to provide a DC power signal to a power only device (not shown) at a given power rating and at a given DC voltage. In some embodiments, the given power rating may include a Watts value and/or a DC voltage value that corresponds to a particular class of power only device.

Figure 11:
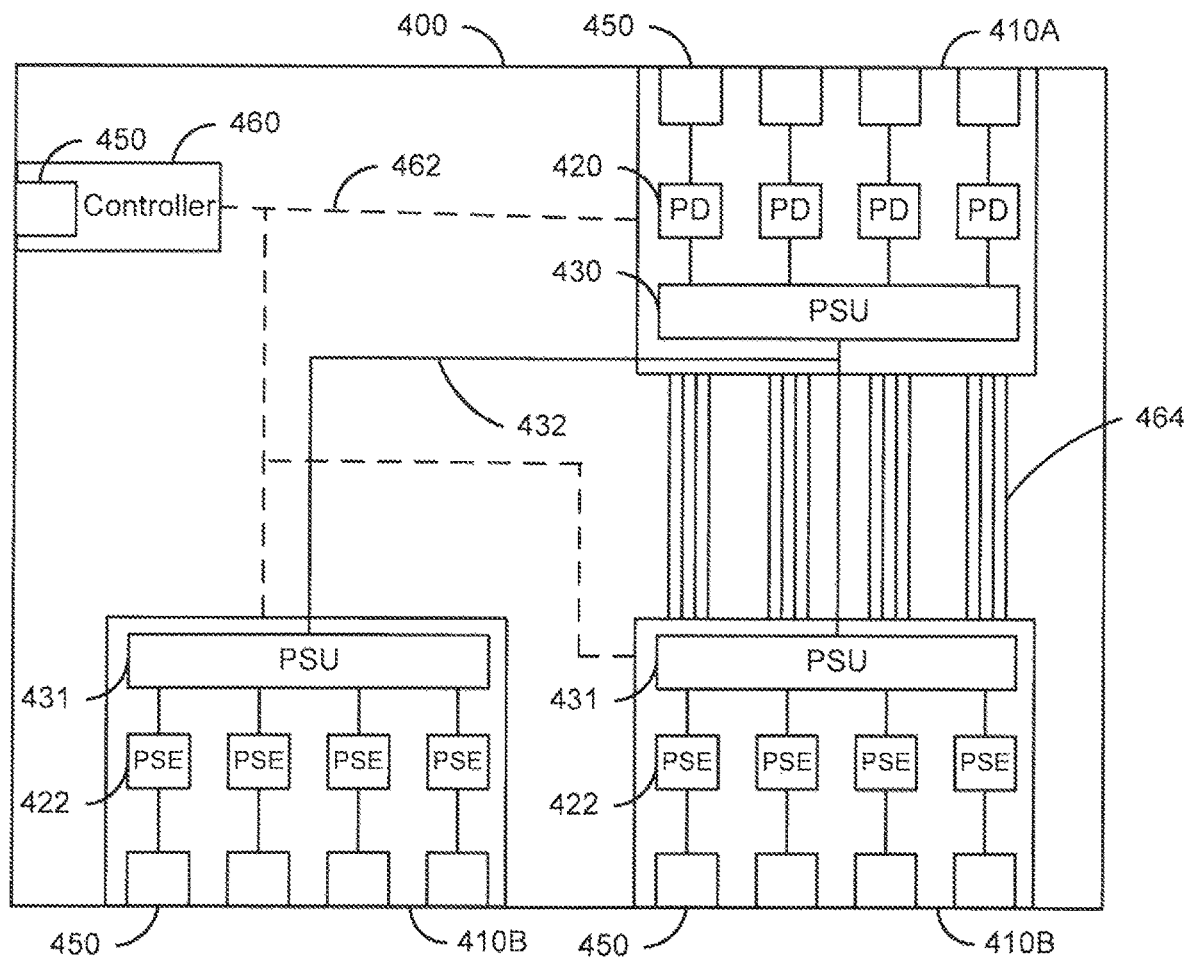
FIG. 11 is a block diagram illustrating a DC power distribution system component using DC power distribution system port modules accordance with some embodiments of the present invention.

Reference is now made to FIG. 11, which is a block diagram illustrating a DC power distribution system component using DC power distribution system port modules in accordance with some embodiments of the present invention. A DC power distribution system component 400 according to some embodiments may be configured as a smart passive splitter having one or more network data pass-through channels. For example, the DC power distribution system component 400 may include the DC power distribution system port module 410A, the power only source modules 410B and the controller 460 described above regarding FIG. 10. Additionally, the DC power distribution component 400 may provide one or more pass-through data channels 464 that provide pass-though data connectivity between communication jacks 450 in the DC power distribution system port module 410A and communication jacks 450 in one or more of the power only source modules 410B.

Figure 12:
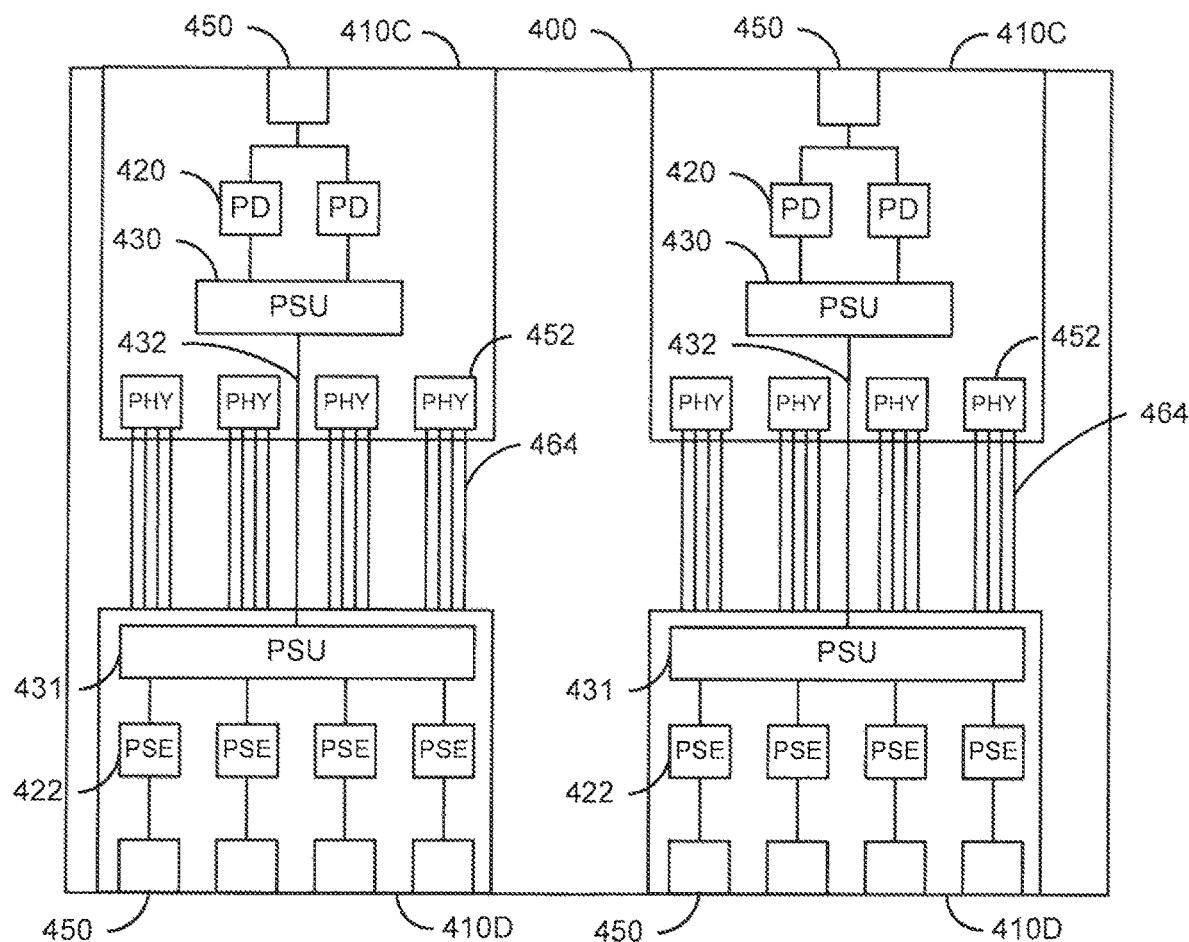
FIG. 12 is a block diagram illustrating a DC power distribution system component using DC power distribution system port modules in accordance with some embodiments of the present invention.

Reference is now made to FIG. 12, which is a block diagram illustrating a DC power distribution system component using DC power distribution system port modules in accordance with some embodiments of the present invention. A DC power distribution system component 400 according to some embodiments may be configured as an active splitter. For example, the DC power distribution system component 400 may include one or more power and data device modules 410C that may each include communication jacks 450, such as RJ-45 or USB-C, among others, that are configured to receive one or more DC power signals from a DC power source and/or another DC power distribution system component. The received DC power signal may be received by one or more powered device circuits 420. The communication jacks 450 may also be configured to receive one or more channels of data. The outputs from the powered device circuits 420 may be received by a power supply unit 430, which may combine and/or modify received DC power signals and generate a combined internal DC power output 432. The data 464 may be switched and/or passed through the power and data device module 410C to other modules in the DC power distribution component 400 using a physical network switch 452. In some embodiments, the physical network switch 452 includes, an Ethernet switch. An example of the physical network switch 452 includes, but is not limited to, a 10/100 Base-T Ethernet switch, among others.

Some embodiments provide that the DC power distribution system component 400 includes one or more power and data source modules 410D. In some embodiments, ones of the power and data source modules 410D may include a power supply unit 431 that is configured to receive the combined internal DC power output signal 432 and to generate one or more DC power signals that may be provided to communication jacks 450 via power sourcing equipment circuits 422. The communication jacks 450 may also be configured to transmit one or more channels of data 464 from sources within the DC power distribution component 400 to power/data devices via the communication jacks 450.

As provided above regarding FIGS. 10-12, DC power distribution system components 400 can be configured to provide a variety of different combinations of power and/or data network distribution and/or functionality. As such, embodiments of DC power distribution systems disclosed herein may include one or more DC power distribution system components 400 that are configured the same and/or different. In addition to being functionally variable, DC power distribution system components 400 may also be provided in different form factors. For example, form factors may include rack mounted components, floor mounted components, ceiling and/or wall surface mounted components, and/or in-ceiling and/or in-wall mounted components. In some embodiments, DC power distribution system components 400 may replace the conventional wall mounted data and/or power receptacles.

Figure 13:
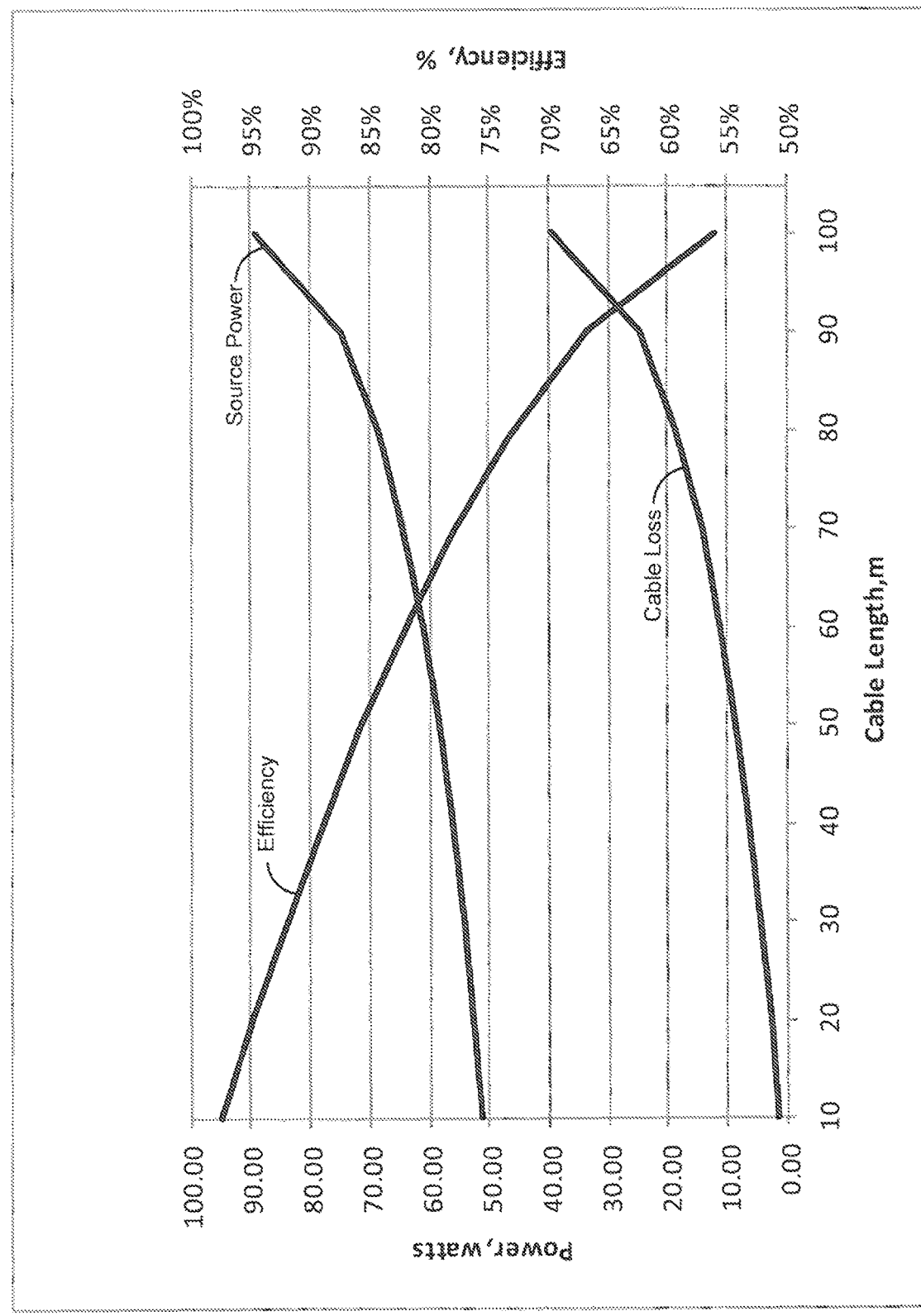
FIG. 13 is a graph illustrating source power, cable loss and efficiency plotted as a function of cable length of a conductor pair connected between a 100 Watt source delivered at 57 Volts and a 50 Watt load.

Some embodiments of a DC power distribution system disclosed herein may be configured to operate over distances such as, for example, 100 meters or more. In this regard, conventional power over Ethernet may be substantially unusable due to line power losses ($I^2/R$) corresponding to such distances. For example, brief reference is now made to FIG. 13, which is a graph illustrating source power, cable loss and efficiency plotted as a function of cable length of a conductor pair connected between a 100 Watt source delivered at 57 Volts and a 50 Watt load. As illustrated, as the cable length increases from 10 to 100 meters, the cable loss increases from less than about 2 Watts to nearly 40 Watts. Similarly, as the cable length increases from 10 to 100 meters, the source power requirement increases from just above 50 Watts to nearly 90 Watts. Additionally, as a result of the cable loss, the efficiency drops from about 97% to about 56%.

Figure 14:
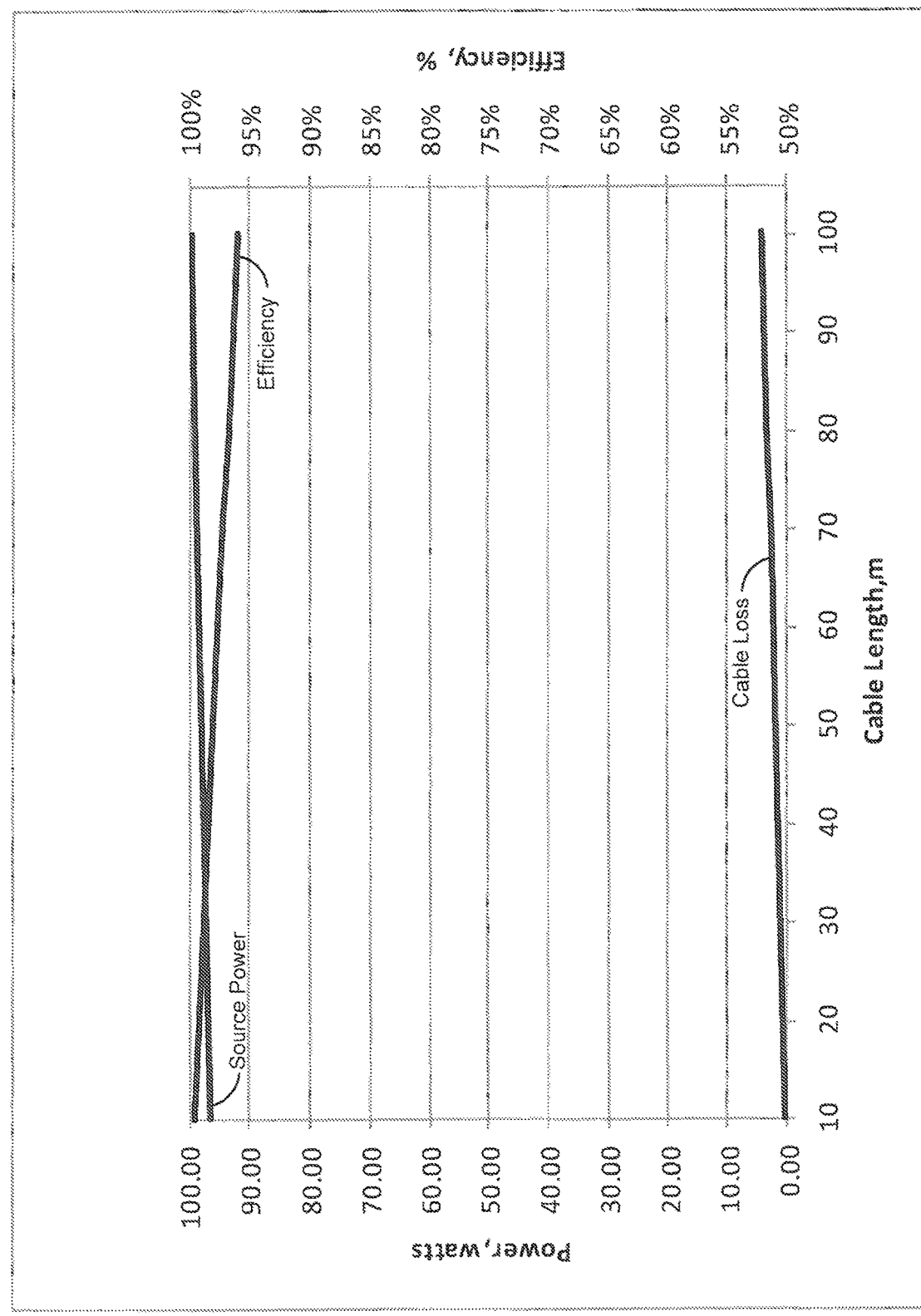
FIG. 14 is a graph illustrating source power, cable loss and efficiency as a function of cable length of a conductor pair connected between a 100 Watt source delivered at 200 Volts and a 98 Watt load.

Brief reference is now made to FIG. 14, which is a graph illustrating source power, cable loss and efficiency as a function of cable length of a conductor pair connected between a 100 Watt source delivered at 200 Volts and a 98 Watt load. As illustrated, when the DC power is delivered at 200 Volts, as the cable length increases from 10 to 100 meters, the cable loss increases from less than about 1 Watt to less than about 5 Watts. Similarly, as the cable length increases from 10 to 100 meters, the source power requirement increases from above 95 Watts to nearly 100 Watts. Additionally, as a result of the reduced cable loss, the efficiency only drops from about 99% to about 96%. Accordingly, DC power distribution systems herein may be operated at DC voltages that exceed 100 Volts, 150 Volts or 200 Volts.

Figure 15A:
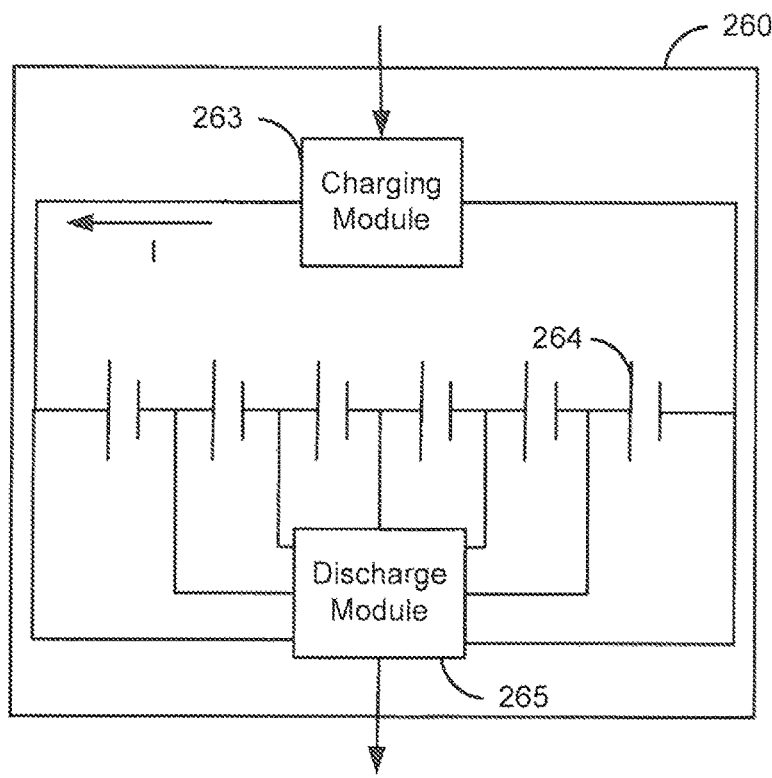
FIGS. 15A and 15B are block diagrams illustrating an electrical energy storage device including a multiple cell battery that is configurable to provide different output voltages in a charging and discharging mode, respectively, according to some embodiments of the present invention.
Figure 15B:
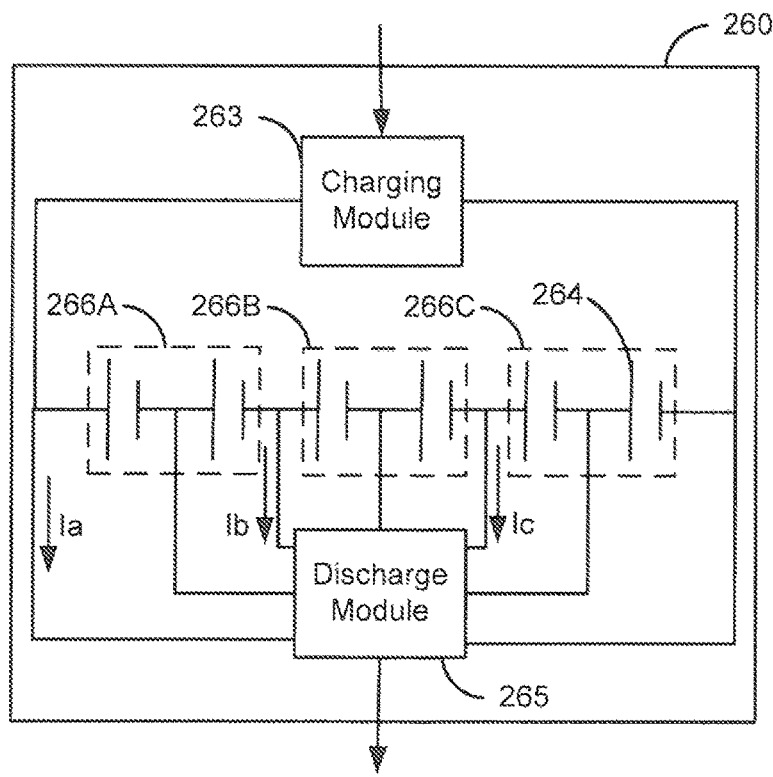

Reference is now made to FIGS. 15A and 15B, which are block diagrams illustrating an electrical energy storage device including a multiple cell battery that is configurable to provide different output voltages in a charging and discharging mode, respectively, according to some embodiments of the present invention. Referring to FIG. 15A, the electrical energy storage device 260 includes a battery that includes multiple battery cells 264 that are arranged in series with one another. Some embodiments provide that the battery cells 264 may, when charged, be configured to provide an operating voltage of about 1.5 V, however, such embodiments are non-limiting as battery cells that are configured to provide operating voltages higher or lower than 1.5 V are contemplated herein.

The electrical energy storage device 260 may include a charging module 263 that is operable to provide a charging current I to the multiple battery cells 264 in series. For example, in the illustrated context of 6 cells, the charging module 263 may generate a charging, voltage that exceeds the series sum of the operating voltages (i.e., 6×1.5V), or 9 V, to provide sufficient charging current I. However, one or more of the electrical loads may be operable to be powered at voltages that are less than the 9 V corresponding to the series voltage of the battery cells 264.

Referring now to FIG. 15B, the electrical energy storage device 260 is operating in a discharge node in which the discharge module 265 is configured to receive currents from three pairs of the 6 battery cells 264. For example, pairs of the battery cells 264 are grouped into three different two cell batteries 266A, 266B, 266C. These two cell batteries 266A, 266B, 266C are operable to provide current Ia, Ib, Ic, respectively at the operating voltage corresponding to the series sum of the cell operating voltage (2×1.5 V), or 3 V. Some embodiments provide that the discharge module 265 is operable to provide a total current Ia+Ib+Ic at 3 V.

Although illustrated as including six different battery cells 264, embodiments herein are not so limited and the quantity of battery cells 264 may be more or less than six. Although illustrated as being combined in two cell groups, embodiments herein are not so limited and the groups may more or less than two battery cells 264. Additionally, some embodiments provide that the discharge module may include multiple outputs corresponding to different quantity of battery cells that are discharged together. For example, a first output may be a 3 V output corresponding to two battery cells 264 while a second output may be a 6 V output corresponding to the other four of the remaining battery cells 264. Additionally, in some embodiments, the charging module 263 may be operable to charge each of the different battery cells 264 independently.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A direct current (DC) power distribution system comprising:
    a passive splitter that comprises:
        an input port that is configured to receive a first DC power input; and
        a plurality of output ports that are configured to provide a first plurality of DC power outputs to corresponding ones of a plurality of power only devices; and
    an active splitter that comprises:
        an input port that is configured to receive a second DC power input and network data corresponding to at least one network communications data channel; and
        a plurality of output ports that are configured to provide a second plurality of DC power outputs and network communications data to corresponding ones of a plurality of power only and/or power/data devices, wherein power/data devices include devices that are configured to be powered to receive data from the active splitter; and
    a communications network switch that includes a plurality of switch output ports,
    wherein a first switch output port of the plurality of switch output ports is configured to provide the first DC power input to the passive splitter using a first network communication cable,
    wherein a second switch output port of the plurality of switch output ports is configured to provide the second DC power input to the active splitter using a second network communication cable,
    wherein the second switch output port of the plurality of switch output ports is configured to provide the network data to the active splitter over the second network communication cable, wherein the passive splitter further comprises:
a first controller coupled to one or more DC-DC converters;
wherein the first controller is operable to receive, via a control data signal port separate from the plurality of output ports, control and/or configuration data corresponding to a desired configuration of the plurality of output ports of the passive splitter, and selectively configure ones of and/or groups of the first plurality of output ports of the passive splitter based on the received control and/or configuration data, wherein the control and configuration data specifies quantities of power to be provided through the plurality of output ports; and
wherein the active splitter further comprises:
a second controller coupled to a power conversion circuit;
wherein the second controller is operable to receive DC power configuration data via the input port from the communications network switch and use the DC power configuration data to configure power characteristics corresponding to each of the plurality of output ports of the active splitter.

2. The DC power distribution system of claim 1, wherein the input port of the passive splitter is configured to receive the first DC power input via at least one pair of conductors in a network communication cable.

3. The DC power distribution system of claim 1, wherein the input port of the passive splitter is configured to receive the first DC power input and a third DC power input over respective pairs of conductors in a network communication cable.

4. The DC power distribution system of claim 3, wherein the first and third DC power inputs include a same power capacity and have a same voltage, and
wherein the passive splitter further comprises a power combining circuit that is operable to receive the first and third DC power inputs and to provide a combined internal DC power output.

5. The DC power distribution system of claim 4, wherein the passive splitter further comprises a power conversion circuit that is configured to receive the combined internal DC power output and to generate at least one of the first plurality of DC power outputs that are provided to corresponding ones of the plurality of output ports, and
wherein the power conversion circuit comprises a DC to DC conversion circuit that generates the at least one of the first plurality of DC power outputs at a different respective voltage than that of the combined internal DC power output.

6. The DC power distribution system of claim 1,
wherein ones of the plurality of output ports in the passive splitter include at least two different connector types,
wherein voltage levels of corresponding ones of the first plurality of DC power outputs is determined based on the respective connector types, and
wherein the voltage levels of at least two of the first plurality of DC power outputs are different from one another.

7. The DC power distribution system of claim 1, wherein ones of the plurality of output ports are configured to provide different amounts of power to respective ones of the plurality of DC power outputs.

8. The DC power distribution system of claim 1, wherein the input port of the passive splitter is further configured to receive a third DC power input, and
wherein the first switch output port is further configured to provide the third DC power input to the passive splitter over respective pairs of conductors in the first network communication cable.

9. The DC power distribution system of claim 1, wherein the communications network switch provides two power circuits at each of the plurality of switch output ports,
wherein the each of the plurality of switch output ports is configured to receive a network communication cable that includes four pairs of conductors, and
wherein a first one of the two power circuits is conducted via a first two pairs of the four pairs of conductors and a second one of the two power circuits is conducted via a second two pairs of the other one of the two power circuits.

10. The DC power distribution system of claim 1, wherein the input port of the active splitter is further configured to receive a fourth DC power input, and
wherein the second switch output port is further configured to provide the fourth DC power input to the active splitter over respective pairs of conductors in the second network communication cable.

11. The DC power distribution system of claim 1, wherein the first controller is configured to determine power requirements for corresponding ones of the plurality of power only devices connected to ones of the plurality of output ports.

12. The DC power distribution system of claim 11, wherein the first controller is further configured to monitor power usage at each of the plurality of output ports.

13. The DC power distribution system of claim 1, wherein the plurality of output ports comprise a plurality of modular output ports that are selected and installed to provide a given combination of output ports having selected ones of different connector types, voltage levels and/or power capacities.

14. The DC power distribution system of claim 1, wherein the passive splitter comprises a plurality of passive splitters that are configured to receive DC power inputs via respective input ports and that are configured to provide respective pluralities of DC power outputs to corresponding ones of power only devices.

15. The DC power distribution system of claim 14, further comprising a communications network switch that includes a plurality of switch output ports,
wherein each of the plurality of passive splitters is coupled to a respective one of the plurality of switch output ports to receive the corresponding DC power input to the respective passive splitter from the communications network switch using first network communication cables, and
wherein the active splitter is coupled to another one of the plurality of switch output ports of the communications network switch to receive the DC power input and the network data using a second network communication cable.

16. The DC power distribution system of claim 14, further comprising a communications network switch that includes a plurality of switch output ports,
wherein a first one of the plurality of passive splitters is coupled to one of the plurality of switch output ports to receive the corresponding DC power input to the passive splitter using a first network communication cable, and
wherein a second one of the plurality of passive splitters is coupled to one of the plurality of output ports of the first passive splitter using a second network communication cable.

17. The DC power distribution system of claim 16, wherein at least one of the first plurality of DC power outputs is configured to be connected to one of the plurality of power only devices, wherein the second one of the plurality of passive splitters comprises a second plurality of DC power outputs, and wherein at least one of the second plurality of DC power outputs is configured to be connected to another one of the plurality of power only devices.

18. The DC power distribution system of claim 1, wherein the passive splitter further comprises an electrical energy storage device that is operable to store electrical energy for the passive splitter.

19. The DC power distribution system of claim 18, wherein the passive splitter further comprises a stored power port that is coupled to the electrical energy storage device and that is configured to receive electrical power into the passive splitter therefrom.

20. The DC power distribution system of claim 18, wherein the passive splitter further comprises an electrical power generator that is coupled to the electrical energy storage device and that is configured to generate electrical energy for storing in the electrical energy storage device.

21. The DC power distribution system of claim 1, wherein the active splitter further comprises an electrical energy storage device that is operable to store electrical energy for the active splitter.

22. The DC power distribution system of claim 21, wherein the active splitter further comprises a stored power port that is coupled to the electrical energy storage device and that is configured to receive electrical power into the active splitter therefrom.

23. The DC power distribution system of claim 21, wherein the active splitter further comprises an electrical power generator that is coupled to the electrical energy storage device and that is configured to generate electrical energy for storing in the electrical energy storage device.

* * * * *